United States Patent
Sturm et al.

(10) Patent No.: US 7,981,340 B2
(45) Date of Patent: Jul. 19, 2011

(54) METHOD OF DEGASSING A FLOWABLE MASS IN A RING EXTRUDER

(75) Inventors: Achim-Phillipp Sturm, Niederuzwil (CH); Jürgen Schweikle, Niederhelfenschwil (CH); Andreas Christel, Zuzwil (CH); Federico Innerebner, Zurich (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 12/653,009

(22) Filed: Dec. 7, 2009

(65) Prior Publication Data

US 2010/0085831 A1 Apr. 8, 2010

Related U.S. Application Data

(62) Division of application No. 10/483,308, filed on Oct. 28, 2004, now Pat. No. 7,654,725.

(30) Foreign Application Priority Data

Sep. 5, 2001 (DE) .................................. 101 43 570

(51) Int. Cl.
*B29B 7/48* (2006.01)

(52) U.S. Cl. ...................... 264/211.23; 366/85; 425/204
(58) Field of Classification Search .................... 366/75, 366/76.4, 85, 301; 425/204; 264/211.23
See application file for complete search history.

(56) References Cited

U.S. PATENT DOCUMENTS

| | | | | | |
|---|---|---|---|---|---|
| 1,356,296 | A * | 10/1920 | La Casse | .................... | 366/76.4 |
| 2,968,836 | A * | 1/1961 | Colombo | ........................ | 366/75 |
| 3,310,837 | A * | 3/1967 | Wittrock | ..................... | 366/76.1 |
| 5,836,682 | A * | 11/1998 | Blach | ............... | 366/84 |
| 6,190,031 | B1 * | 2/2001 | Blach et al. | .................... | 366/75 |
| 6,838,496 | B1 * | 1/2005 | Goedicke et al. | ............. | 523/343 |
| 7,040,798 | B2 * | 5/2006 | Innerebner et al. | ........ | 366/76.3 |
| 7,080,935 | B2 * | 7/2006 | Innerebner et al. | ............ | 366/85 |
| 7,654,725 | B2 * | 2/2010 | Sturm et al. | ................... | 366/85 |
| 2004/0094862 | A1 * | 5/2004 | Sturm et al. | ................. | 264/211 |

* cited by examiner

*Primary Examiner* — David L Sorkin
(74) *Attorney, Agent, or Firm* — Francis C. Hand; Carella, Byrne, Cecchi

(57) ABSTRACT

The method of degassing is performed in a ring extruder wherein at least one process chamber is provided with at least one degassing opening. The radius R of the conveyor element in the degassing zone is smaller by $\Delta R$ than the full radius Rv of the conveyor element required for the mutual stripping of adhering product in a closely intermeshing screw operation with adjacent conveyor elements.

2 Claims, 5 Drawing Sheets

$R = R(\varphi, x)$

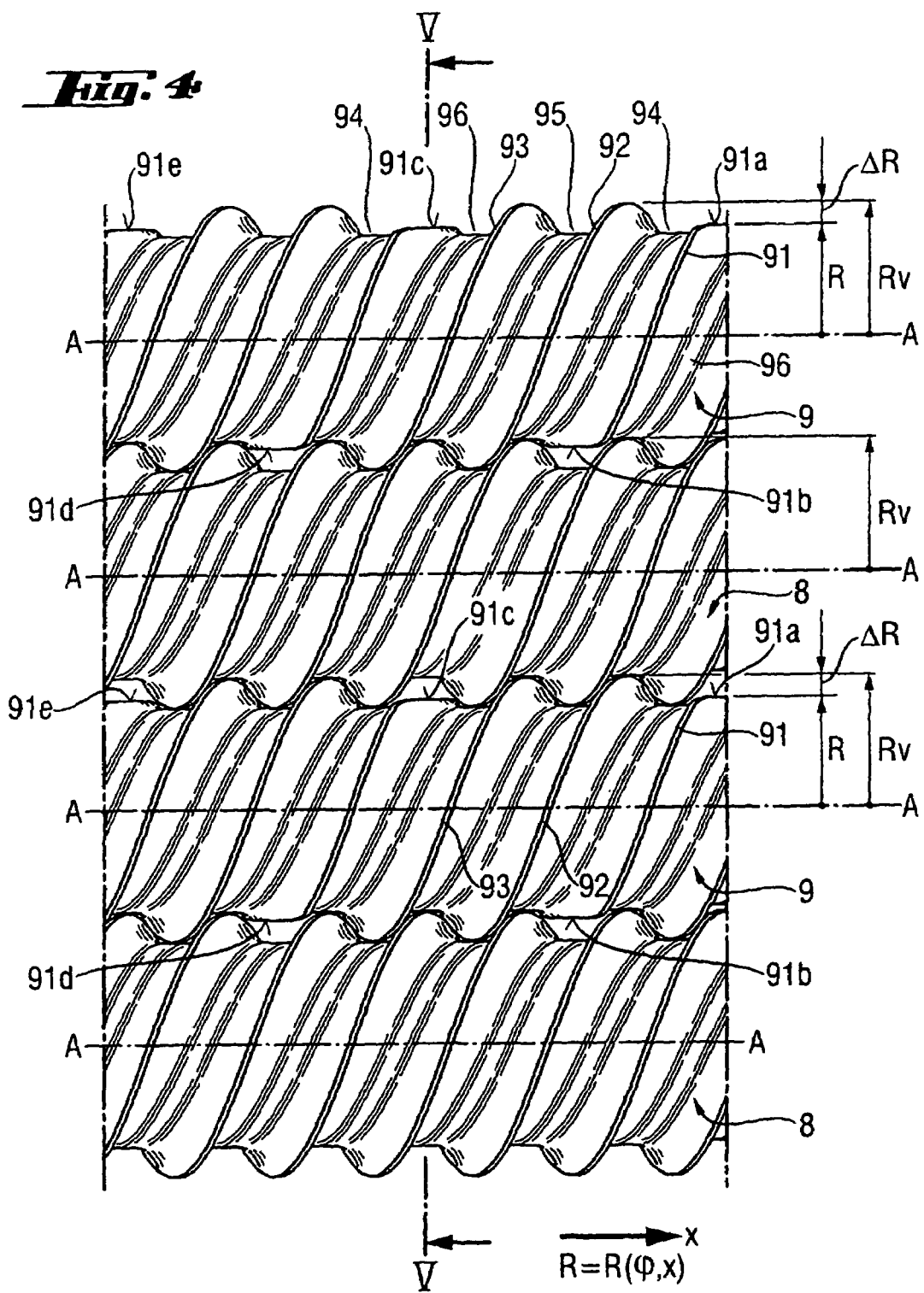

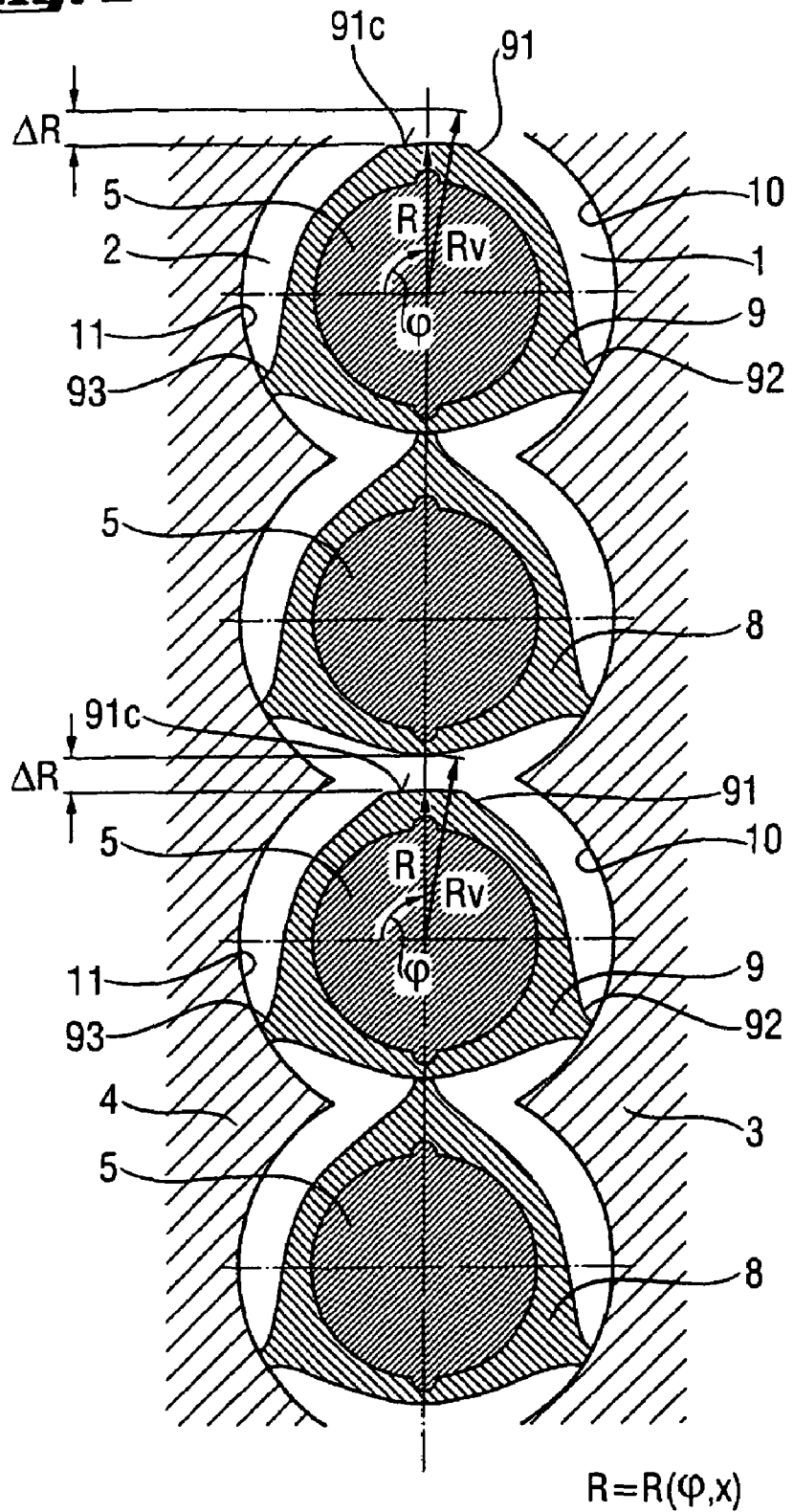

METHOD OF DEGASSING A FLOWABLE MASS IN A RING EXTRUDER

This is a Divisional application of Ser. No. 10/483,308, filed Oct. 28, 2004, now U.S. Pat. No. 7,654,725.

The present invention relates to a method of degassing viscous or viscoelastic flowable masses in a ring extruder having multiple process chambers.

For the degassing of viscous masses, such as polyester melts, or viscoelastic masses, such as rubber mixtures, in a multiple-screw extruder, the mass to be degassed is typically distributed within the multiple-screw extruder in multiple process chambers depending on the arrangement of the screws, which are equipped with processing elements.

In known multiple-screw extruders and methods of the type initially cited, these process chambers are separated from one another in at least some sections along the extruder conveyance direction (lengthwise direction), either by screws having closely intermeshing and mutually stripping conveyor elements, so that hardly any material exchange (neither gas nor mass) occurs between neighboring process chambers in these chambers, or they are connected to one another by regions in which one or more screws has no processing element, so that material exchange (gas and mass) may occur between the process chambers.

For multiple-screw extruders having multiple process chambers, until now either closely intermeshing or non-closely intermeshing conveyor elements were always used, so that either a stripping, self-cleaning effect of neighboring screws was achieved, but practically without any material exchange between the process chambers, or a noticeable material exchange is achieved between the process chambers, but without the stripping, self-cleaning effect of neighboring screws. This is especially disadvantageous if regions of this type having conveyor elements are located in the region of degassing openings of the extruder.

The present invention is therefore based on the object, in a ring extruder having multiple process chambers of the construction initially cited, of ensuring both a self-cleaning effect of the conveyor elements and material exchange between different process chambers, particularly in the region of the degassing zones.

Briefly, the invention provides a method of degassing viscous or viscoelastic flow masses in a ring extruder having multiple process chambers, which are each separated from one another by multiple screws, positioned parallel to one another, having essentially closely intermeshing conveyor elements, at least one of the process chambers having at least one degassing zone having a degassing opening and each of the process chambers being partially filled with the mass to be degassed, which is processed in each process chamber and conveyed through these process chambers using the conveyor elements of the screws delimiting the particular process chamber. In accordance with the invention, there is at least one connection opening between the particular process chambers.

Further advantages, features, and possible applications of the present invention result from the following description of two exemplary embodiments of the present invention with reference to the attached drawing, in which:

FIG. 4 is a schematic view of a detail of the arrangement of the screws in the second exemplary embodiment of the ring extruder according to the present invention; and FIG. 5 is a sectional view of the sectional plane V-V of FIG. 4.

Figure 1:
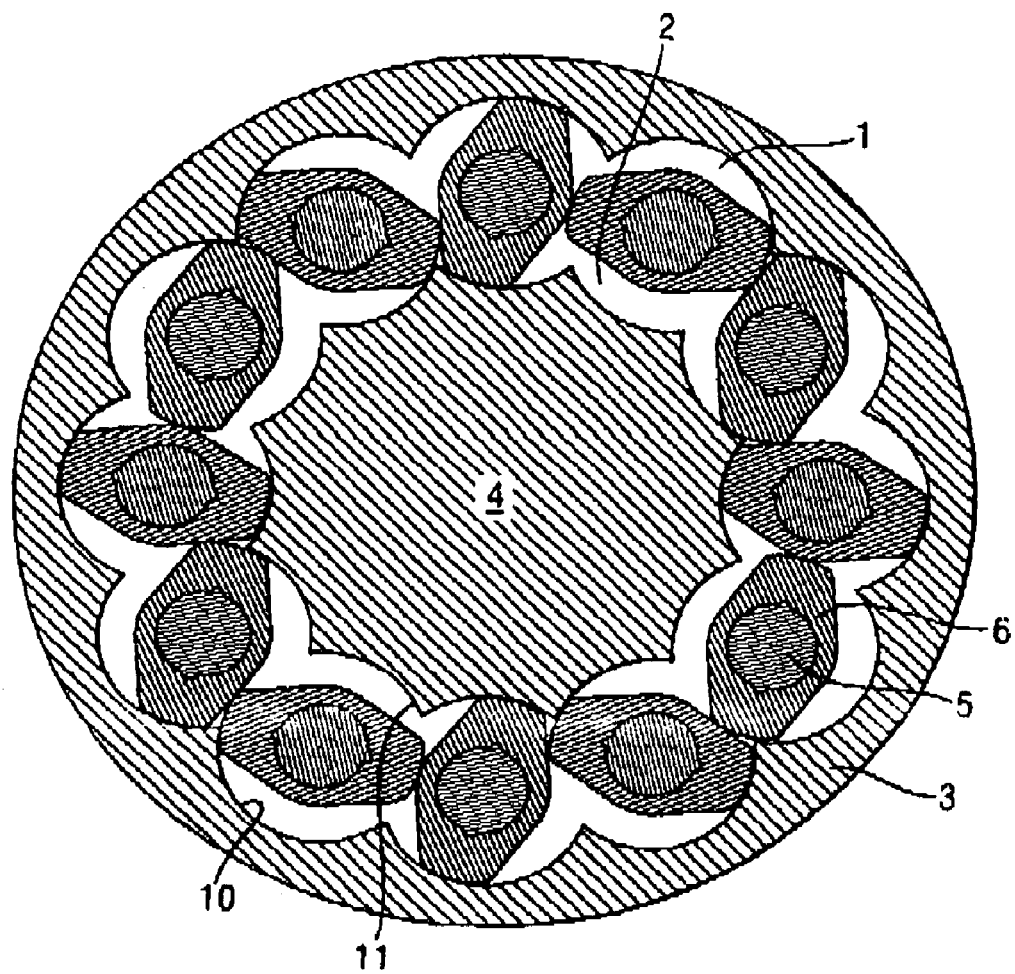
FIG. 1 is a schematic sectional view perpendicular to the conveyance and/or lengthwise direction of a ring extruder of the related art.

FIG. 1 is a sectional view of a ring extruder of the related art along a sectional plane perpendicular to the conveyance and/or lengthwise direction of the extruder. In this case, the ring extruder includes 12 screws 5 positioned parallel to the lengthwise and/or conveyance direction of the extruder like a collar, each of which carries a double-threaded conveyor element 6. The 12 screws 5 positioned like a collar are implemented as closely intermeshing, so that the outer process chamber 1 of the ring extruder is separated from the inner process chamber 2 of the ring extruder. The screws 5 positioned like a collar are mounted between a housing 3 and a core 4, which is fixed in relation to the housing. The face of the housing 3 which faces toward the screw collar appears in the cross-sectional view as the outer flower 10. The face of the core 4 which faces toward the screw collar appears in cross-section as an inner flower 11.

Figure 2:
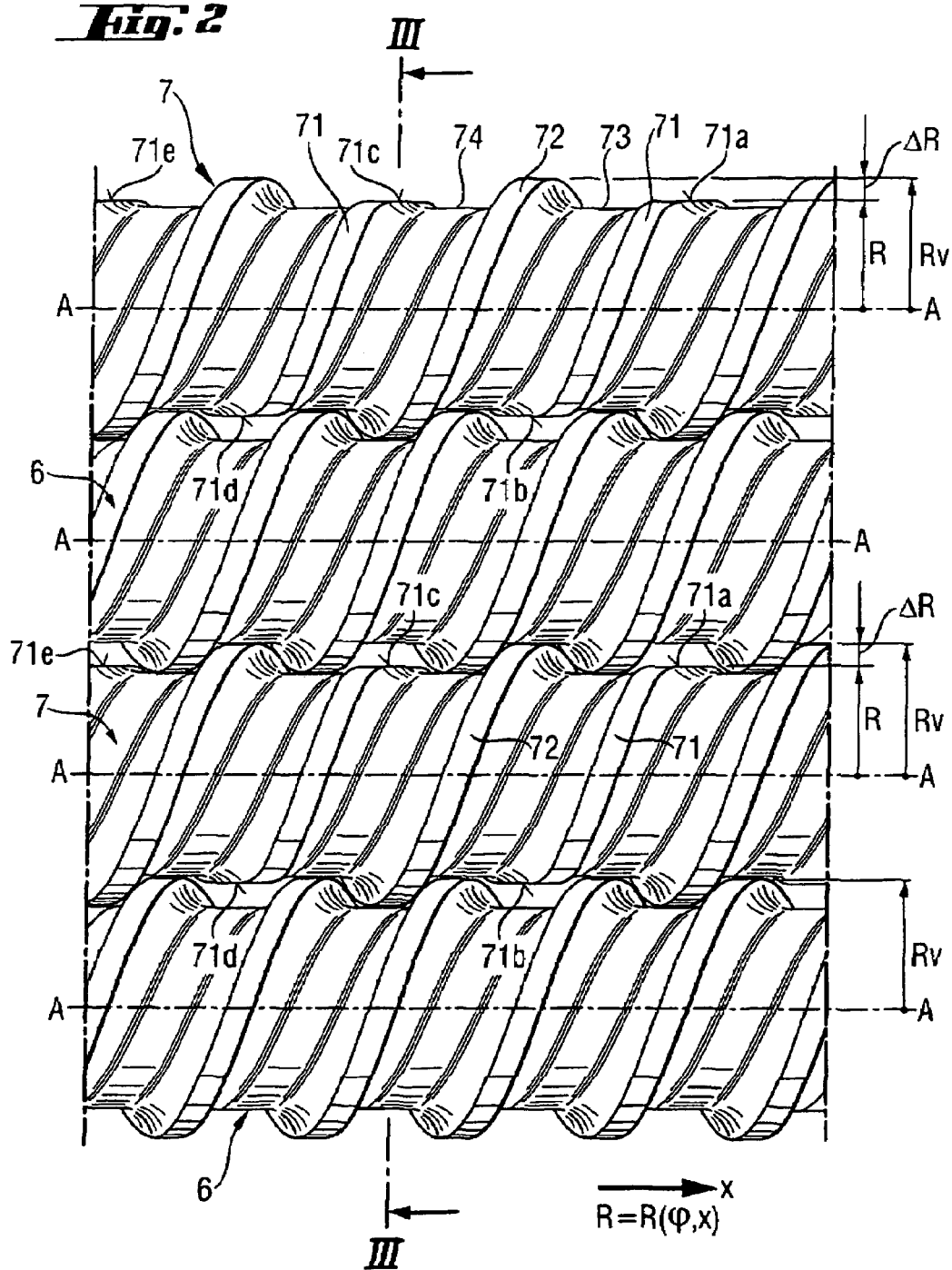
FIG. 2 is a schematic view of a detail of the arrangement of the screws in a first exemplary embodiment of the ring extruder according to the present invention.

FIG. 2 is a schematic view of a detail of the screw arrangement in a first exemplary embodiment of the ring extruder according to the present invention, whose conveyor elements 6, 7 are each implemented as double-threaded conveyor elements. In order to simplify the illustration, the 4 conveyor elements illustrated are shown lying next one another in one plane (plane of the drawing). In reality, however, they may be positioned both in a plane and like a collar on a cylindrical surface, as in a ring extruder, for example. The conveyor elements 6, 7 are double-threaded conveyor elements, double-threaded conveyor elements 6 without clipping and double-threaded conveyor elements 7 with clipping following one another alternately. The clipping in the clipped double-threaded conveyor elements 7 is produced in that, for the first land 71, this land is clipped by an amount ΔR in subsections 71a, 71b, 71c, 71d and 71e of the first land 71, so that in these regions the radius R is reduced by a differential amount ΔR in relation to the complete radius Rv. In the present case, the clipped regions 71a, 71b, 71c, 71d and 71e of the first land 71 are each offset by 180° around the circumference of the conveyor element 7, the second land 72 remaining without clipping. During operation of the extruder, this allows both material exchange along the lengthwise direction A between the two neighboring threads 73 and 74 of the conveyor element 7 and material exchange between the first process chamber 1 (FIG. 3) and the second process chamber 2 (FIG. 3) of the extruder. A material exchange occurs during operation of the extruder via the passage subsections 71a, 71b, 71c, 71d and 71e. In this case, both gas and molten mass may change over from the first process chamber 1 into the second process chamber 2.

Figure 3:
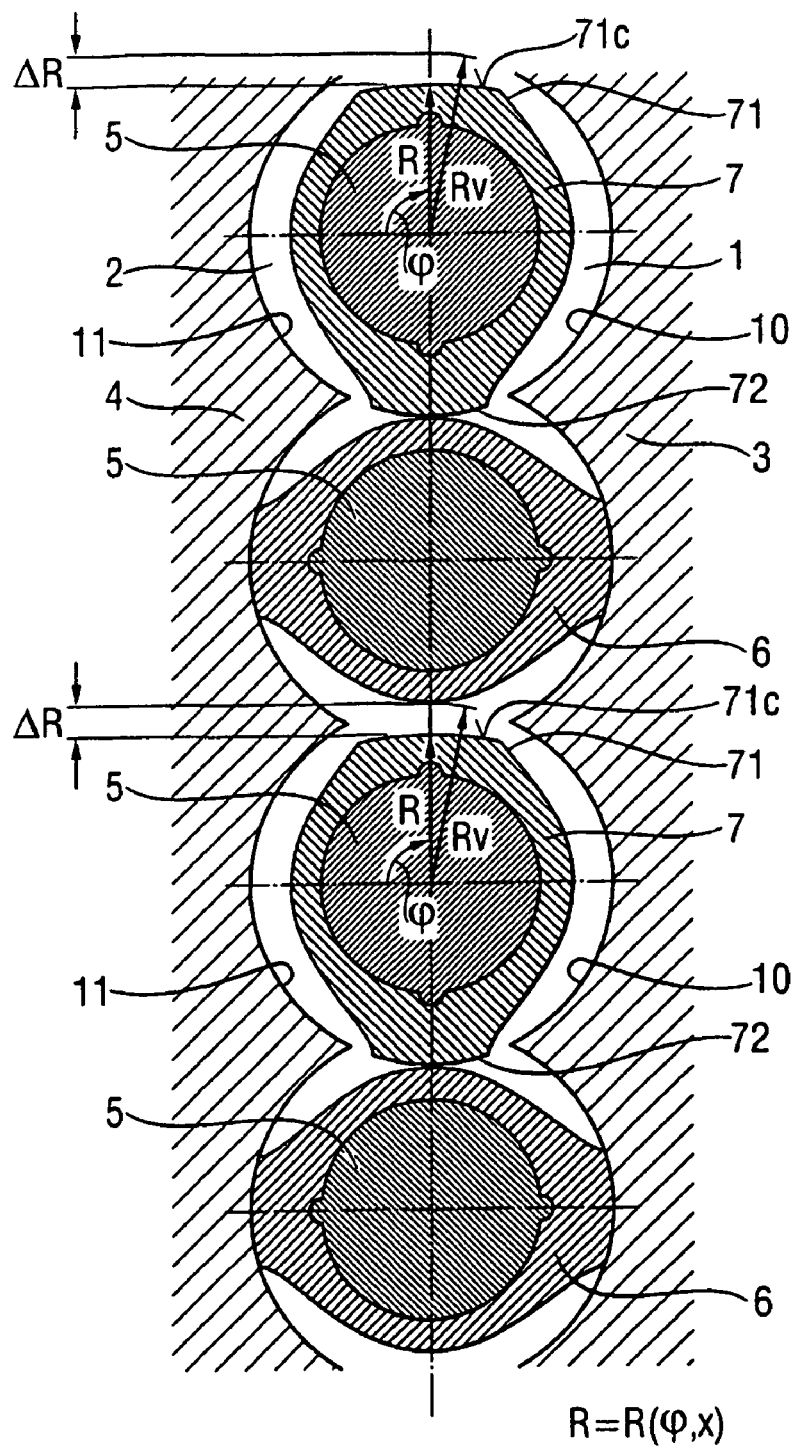
FIG. 3 is a sectional view of the sectional plane of FIG. 2.

FIG. 3 is a sectional view of the section plane III-III of FIG. 2, the housing 3 and the core 4 of the extruder additionally being shown in this case. The neighboring screws are a passage screw and a typical screw in turn, a double-threaded conveyor element 7, in which a land is clipped in a subsection by an amount ΔR in relation to the complete radius Rv, being attached rotationally fixed on the screw rod 5 of the passage screw, while a typical conveyor element 6 without clipping, i.e., with a continuous complete radius Rv, is attached rotationally fixed on the typical screw 5.

FIG. 4 is a schematic view of a detail of the screw arrangement in a second exemplary embodiment of the ring extruder according to the present invention. Instead of the double-threaded conveyor elements 6, 7 of FIG. 2, in this case triple-threaded conveyor elements 8, 9 are used. In this case as well, passage screws are positioned alternately with typical screws. While the screw rods 5 of the typical screws carry conveyor elements 8 without any clipping, the screw rods 5 of the passage screw carry conveyor elements 9 having partial clipping. The triple-threaded conveyor element 5 has a first land 91, a second land 92, and a third land 93, between which a first thread 94, a second thread 95, and a third thread 96 are implemented. In the present case, the first land 91 of the conveyor element 9 is clipped in subsections 91a, 91b, 91c, 91d and 91e of the first land 91 by an amount ΔR in relation to the complete radius Rv. In this case as well, the clipped subsections of the first land 91 are each offset in relation to one another by 180° around the circumference of the conveyor element 9. In this case as well, material exchange along the lengthwise direction A between the thread 94 and the thread 96 of the conveyor element 9 and between the first process chamber 1 (below the plane of the drawing) and the second process chamber 2 (above the plane of the drawing) is allowed by the connection openings 91a, 91b, 91c, 91d and 91e.

FIG. 5 is a sectional view of the sectional plane V-V of FIG. 4. FIG. 5 essentially corresponds to FIG. 3, the double-threaded conveyor elements 6 (without clipping) and 7 (with clipping) merely being replaced by triple-threaded conveyor elements 8 (without clipping) and 9 (with clipping). All further reference numbers and/or elements of FIG. 5 correspond to the same reference numbers and/or elements of FIG. 3. In order to also allow material exchange between all threads 94, 95 and 96 along the lengthwise direction A in the second exemplary embodiment (FIGS. 4 and 5), in addition to the land 91, the land 92 or the land 93 must be clipped in at least one subsection.

Depending on the properties of the viscous or viscoelastic mass to be processed, the clipped regions 71a, 71b, 71c, 71d and 71e of the first land 71 of the double-threaded conveyor element 7 may also extend over a larger region around the circumference.

The same also applies for the clipped regions 91a, 91b, 91c, 91d and 91e of the first land 91 of the triple-threaded conveyor elements 9 of the second exemplary embodiment (FIGS. 4 and 5). In this case as well, the clipped regions of the first land 91 may extend over a larger peripheral region of the triple-threaded conveyor element 9. In the extreme case, the first land 91 of the triple-threaded conveyor element 9 may also be completely removed, for example.

Both for the first and the second exemplary embodiment, having double-threaded and triple-threaded conveyor elements, respectively, it is not absolutely necessary for the particular clipped conveyor elements 7 and 9 to alternate with unclipped conveyor elements 6 and 8, respectively. Thus, for example, all of the conveyor elements may be partially clipped or only every third or even every fourth conveyor element of the neighboring screws may be clipped, etc.

In the figures, the differential radius ΔR and/or the radius R of the conveyor element may be described formally as a function R (Φ, x) of the peripheral angle Φ around the circumference of the conveyor element and of the axial location x along the axial lengthwise direction of the conveyor element.

What is claimed is:

1. A method of degassing viscous or viscoelastic flow masses in a ring extruder having multiple process chambers, which are each separated from one another by multiple screws, positioned parallel to one another, having essentially closely intermeshing conveyor elements, at least one of the process chambers having at least one degassing zone having a degassing opening and each of the process chambers being partially filled with the mass to be degassed, which is processed in each process chamber and conveyed through these process chambers using the conveyor elements of the screws delimiting the particular process chamber, wherein there is at least one connection opening between the particular process chambers that continuously changes during the operation of the ring extruder and wherein the change of the connection opening is that the connection opening moves back and forth cyclically in the region of the degassing zone along a lengthwise direction.

2. The method according to claim 1 wherein the ring extruder has a first process chamber and a second process chamber, which is separated from the first process chamber by multiple screws positioned parallel to one another having essentially closely intermeshing conveyor elements.

* * * * *